June 12, 1945.  W. J. PODBIELNIAK  2,377,900
FRACTIONATION TEMPERATURE GRADIENT METHOD OF ANALYSIS
Filed Oct. 7, 1942  3 Sheets-Sheet 3

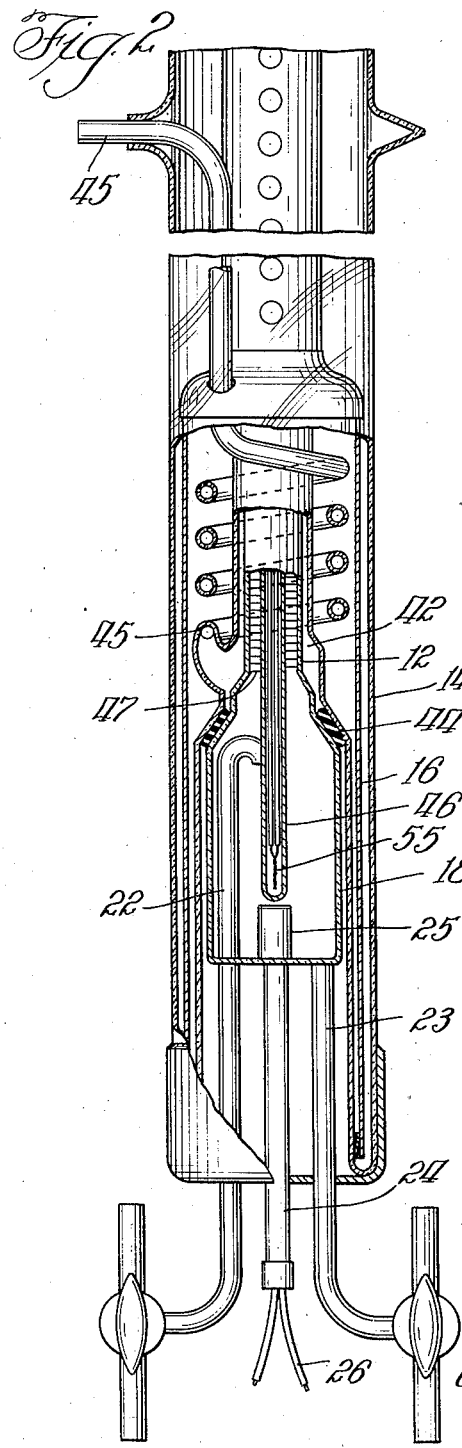
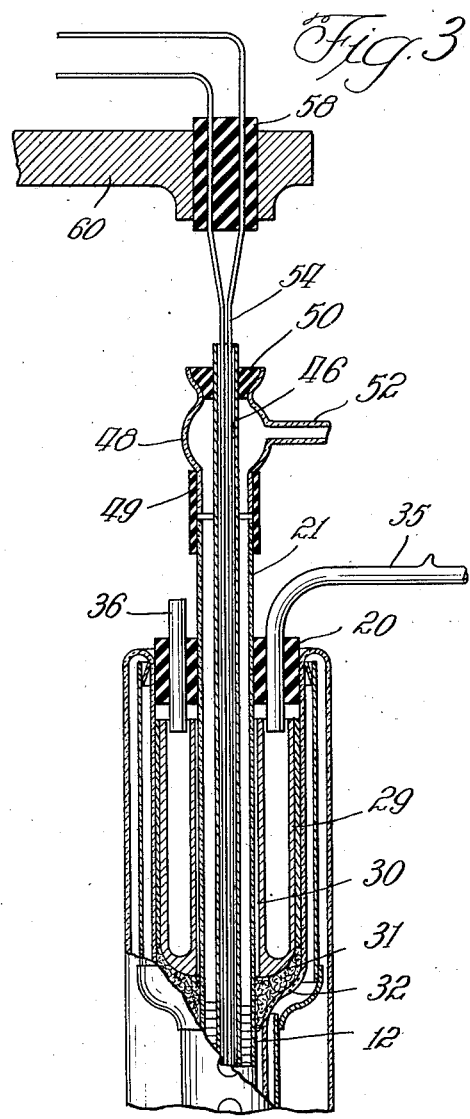

Inventor:
Walter J. Podbielniak
By: Benjamin B. Schneider
Att'y.

Patented June 12, 1945

2,377,900

UNITED STATES PATENT OFFICE 2,377,900

FRACTIONATION TEMPERATURE GRADIENT METHOD OF ANALYSIS

Walter J. Podbielniak, Chicago, Ill., assignor to Benjamin B. Schneider

Application October 7, 1942, Serial No. 461,108

13 Claims. (Cl. 73—26)

This invention relates to apparatus and method for analyzing in a relatively short time a mixture of gaseous or vaporizable liquid hydrocarbons or other compounds such as natural gas, natural gasoline, cracked refinery gases and gasolines and other petroleum gases and distillates as well as mixtures of other distillable materials such as coal tar distillates, commercial solvents, etc. In particular, however, this invention is most suitable for relatively rapid analyses for plant control purposes, as of butenes-butanes-butadiene fraction in catalytic or other cracking, alkylation, isomerization and butadiene conversion plants, for routine automatic tests of motor fuels for true boiling point curve, etc.

In carrying out the method of my invention, a relatively small sample of the material to be analyzed is introduced into a fractionating column and allowed to come to equilibrium at total reflux. In most cases, the size of the sample is conveniently adjusted to be just slightly more than enough to wet the packing of a relatively long, (about 4 to 6 ft.) and efficient column of uniform characteristics throughout its length, preferably one having an efficiency of 200 plates or more, under total reflux conditions. One such column may be made with the type of packing such as is described in my prior copending application Serial No. 372,721, filed January 2, 1941. When equilibrium is reached, temperatures are accurately measured at closely spaced intervals throughout the length of the column, say about every ¼ in., preferably by means of a single-junction fine wire thermocouple movable lengthwise in the column, thereby indicating or, with suitable instruments, recording, the temperature gradient of the column as a function of its length. Since the quantity of each component of the sample thus held up on the wire of the packing is also a function of the length of the column wetted by it, the recording is, therefore, a temperature gradient curve or true distillation curve of the sample from which calculations may be made to determine the quantity and/or per cent of each distinctive component of the sample.

Since the separation of methane and lighter components from ethane is relatively easy, it is usually desirable to remove all or most of the methane and lighter components from the sample before permitting the sample to come to equilibrium in the column under total reflux conditions. Thus, in the case of a low-temperature fractionating analysis in accordance with the present invention, the gaseous sample is introduced into the distilling bulb after evacuation of the column and distillation is initiated and carried out to separate methane and lighter components, etc. and vent them from the column into the distillate receivers as fully described in my prior patents, Nos. 1,917,272, granted July 11, 1933; 1,967,258, granted July 24, 1934; 2,009,814, granted July 30, 1935, and 2,275,648, granted March 10, 1942. This preliminary distillation may be carried out either in the special column of the present invention to be described, in which case the thermocouple-junction is suitably located in the reflux to indicate condensing temperature of the vaporous product, or in a separate conventional low-temperature fractionating column such as is shown and described in my Patent No. 2,275,648. In the latter case, the ethane and heavier portion of the sample, or the propane and heavier portion (if both methane and ethane are thus vented), or even the C4 and heavier portion only (when special sensitivity is desired in the butenes-butanes region), may then be passed to the column of the present invention by suitable chilling of the bulb of the latter with liquid air after being connected to the first column. The size of this sample is as set forth above, due allowance being made for the lighter components, etc. vented from the column. After the methane, etc. or other lighter components are distilled from the sample, the top of the column is closed and the sample permitted to come to equilibrium under low heat input and total reflux conditions. This usually takes from about ½ to about 1 hour, depending upon the character of the sample and accuracy of separation required. Thereafter, the temperature against the position of the thermocouple within the column is either manually plotted or automatically recorded to form the distillation curve as described above. The actual calculations for the analysis of the gas sample must, of course, allow for the lighter components vented from the column and any liquid high-boiling point residue present in the distilling bulb during equilibrium of the sample under total reflux conditions, or removed and separately measured in the vapor phase either before or after plotting the temperature gradient curve.

Hereafter the expression "methane and lighter" will refer not only to methane and lighter, but to ethane and lighter or propane and lighter which may be distilled preliminary to analysis in accordance with this invention, except in the case of the specific illustrative example. The new method outlined above has several features novel in fractional distillation analysis, of which three are outstanding: 1. The operation of the column at total reflux or at infinite ratio makes possible separations with a given column efficiency which are impossible with any finite product rate as practiced in the usual method of fractional distillation analysis. 2. Most efficient column packings, including the packing here preferred increase in fractionating efficiency as measured by plate number as their vapor rate is reduced. However, in all product distilling methods it is impracticable to reduce the column vapor rate to very low values as this correspondingly cuts down either product rate or reflux ratio rate, with resulting time increase. With the present method, there being no product distilled, the vapor rate can be reduced very greatly, thus substantially increasing the plate efficiency of the column, with no increased and, in fact, with decreased analysis time. Also, it is now possible to design packings specially for maximum plate number per inch, or for minimum H. E. T. P., if a low vapor rate can be tolerated, as is possible in this method. 3. since no product is taken off, this method permits the elimination of distillate receivers, measuring burets, etc., and the operating procedure becomes both extremely simple and possible of nearly 100% automatic control and recording.

The distillation curve of the sample is, preferably, recorded on the chart of a recording pyrometer, suitably of the potentiometer galvanometer type described generally in my prior Patent No. 2,275,648 or, preferably of the potentiometer electronic type sold by the Brown Instrument Company of Philadelphia, Pa. With the galvanometer type of recording pyrometer, in connection with which the present invention will be described because it is more readily available at the present time, the chart roll is driven by a motor intermittently operated by a conventional electric or other timer mechanism to allow for balancing the recording pen with the temperature in the column at each new position of the thermocouple and to permit the thermocouple to cool down or warm up, depending upon the direction of the movement of the thermocouple within the column, to the temperature of its next position. Thus, the timer mechanism may be set to operate the motor intermittently during the analysis and drive the chart roll rapidly to run off from about 1/8 in. to about 1/2 in. of chart, depending upon the desired distance between each successive movement of the thermocouple, and then stop the motor, say from 3 to 5 seconds, to allow for a true temperature record.

In actual practice and for automatic operation the movement of the thermocouple within the column is coupled with the movement of the chart roll chart and the extent of movement of each is exactly proportional. This may be accomplished by coupling the thermocouple junction to the motor which operates the chart roll through suitable supports and mechanical connections. The operation may, of course, be carried out manually by raising or lowering the thermocouple, as desired, to the desired extent and by simultaneously unrolling the recorder chart a proportional distance. The thermocouple is then permitted to remain at its location until the recorder pen reaches equilibrium and then both the chart and thermocouple are advanced simultaneously as before. This operation is continued until the thermocouple is moved throughout the length of the column and the complete temperature gradient curve thus obtained. Regardless of the direction of movement of the thermocouple within the column, whether up or down, the chart is always unrolled. If the thermocouple is moved upwardly in the column the temperature gradient curve of the higher boiling components of the sample is first plotted and if the movement is downwards the curve of the lower boiling components is first plotted. When the column is in equilibrium, identical curves are obtained by movement of the thermocouple either upwardly or downwardly and hence a movement in only one direction, preferably upwardly, is necessary. For check purposes, however, temperature gradient curves may be derived from both upward and downward movements of the thermocouple to ascertain that equilibrium had actually been reached within the sensitivity of the temperature indicating or recording device, and to detect any discrepancies.

The present invention will be fully understood from the following detailed description of apparatus suitable for conducting low-temperature fractionations taken with a detailed description of the method. It is, of course, to be understood that my invention is not to be construed as limited to the details of the embodiments shown and described since these details may be varied without departing from the scope of my invention as defined in the appended claims. Neither is it to be understood that my invention is to be limited to low-temperature fractionating apparatus or low-temperature operations carried out either at atmospheric pressure or other pressures above or below atmospheric since my invention is equally applicable to high-temperature fractionating apparatus and to high temperature operations carried out at atmospheric, sub-atmospheric or super-atmospheric pressure. Likewise while this method has special usefulness in control type or routine analyses because of its simplicity and short time, it is not limited to such applications but may be applied through suitable apparatus design, instrumentation and other suitable procedures to precise research-type investigations. The following is merely intended for illustrative purposes.

Reference is made to the accompanying drawings, wherein:

Fig. 2 is an enlarged, detailed, broken longitudinal section through the lower portion of the fractionating column of the apparatus, with parts in elevation and parts broken away to show the thermocouple and packing assemblies;

Fig. 3 is a similar view of the upper portion of the fractionating column, showing the means for withdrawing the thermocouple from the column;

Figure 1:
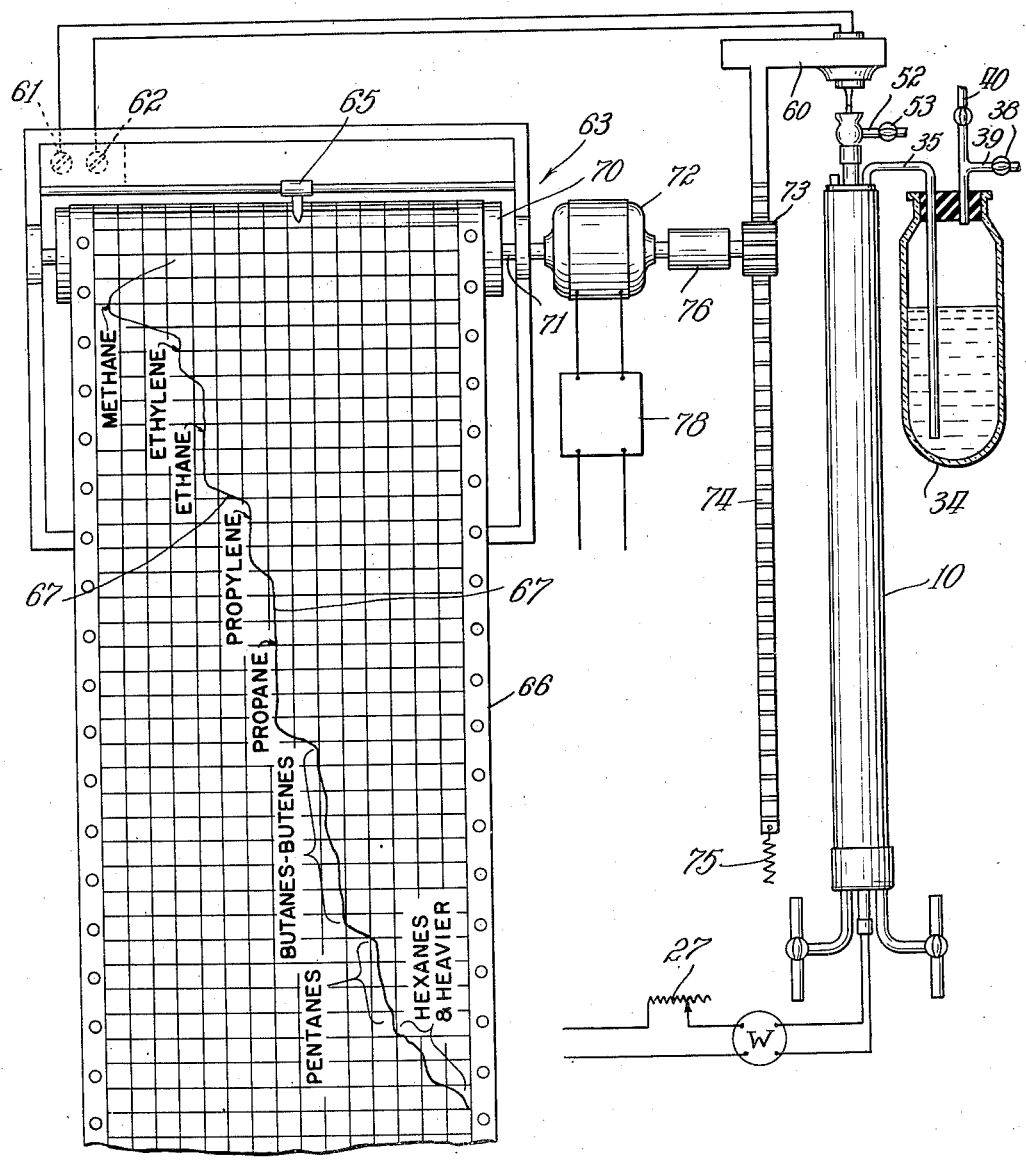
Figure 1 is a general view, partly in elevation and largely diagrammatic, of a layout of apparatus suitable for carrying the invention into effect.

Referring more particularly to the drawings, the numeral 10 indicates, generally, a fractional distillation column which is substantially similar to the column shown in my Patent No. 2,275,648, except for certain modifications necessary for carrying out the present invention which will be described hereinafter. While I prefer to carry out the method of my invention in a modified form of the column shown and described in Patent No. 2,275,648, it is, of course, to be understood that the columns of my prior patents, Nos. 1,917,272 and 2,009,814, as well as other columns, may be similarly modified as described herein and used in lieu thereof.

The fractionating column structure illustrated comprises a distilling tube 12 surrounded by an evacuated jacket member 14, both formed of a low expansion heat-resistant glass such as "Pyrex," or other suitable material, and a metallic reflector member 16 which is mounted between the spaced walls of the jacket member and which extends substantially throughout the length thereof. The lower end of the distilling tube is enlarged to form a distilling bulb 18 and the upper end of the tube extends through a stopper 20 of rubber or rubber-like material, which plugs the opening at the top of the column, and out through the column as at 21. A sample inlet tube 22 of glass or other suitable material extends into the bulb 18, and a tube 23 of similar material serves to establish communication between the bulb and a mercury bottle (not shown) and between the bulb and a graduated receiver (not shown) for the purposes fully described in my prior application Serial No. 303,434, filed November 8, 1939.

Heat may be supplied to the sample in the bulb by means of a metal-clad, cartridge-type, electric resistance heater 24 which extends into an "off-centered" glass heater well 25 formed in the bottom of the bulb. The current supply wires 26 of the heating element lead to a conventional rheostat 27 which may be controlled to regulate accurately the heat input. Obviously, any other suitable heating means may be employed for this purpose.

In the upper portion of the column, immediately beneath stopper 20, a double-walled annular metallic vessel 29 surrounds tube 12 and is spaced therefrom as at 30, as in my prior Patent No. 2,275,648. The vessel is supported in the position shown by a suitable insulating material such as glass wool 31 which surrounds the tube and rests on a shoulder 32 formed in the inner wall of vacuum jacket 14. Liquid air is introduced into vessel 29 from a thermos bottle 34 through a vacuum-jacketed, silvered tube 35 which extends through stopper 20 and into the mouth of the vessel. The liquid air serves to cool the vessel and, in turn, the tube 12 to condense vapors therein and provide reflux. The liquid air vaporized in the vessel is vented through a tube 36 which extends from the vessel through the stopper. The supply of liquid air to the vessel may be manually controlled, as by a hand-operated valve 38 in a compressed air supply line 39 leading to a suitable compressor; or it may be controlled automatically as in my Patent No. 2,275,648. A valve-controlled vent tube 40 is provided to vent the compressed air from thermos bottle 34 to the surrounding space.

In the operation of the fractionating column shown herein, the vaporized liquid air circulates in the vessel 29 and then escapes through vent 36. In the event it is desired, during operation in accordance with the present invention, to circulate liquid air vapors throughout the length of the tube, vent 36 may be plugged or even dispensed with and an opening provided in the wall of vessel 29 adjacent the tube to establish communication between the vessel and space 30 as in my Patent No. 2,275,648. The vaporized liquid air will then flow through space 42 between tube 12 and the inner wall of vacuum jacket 14 to the bottom thereof, formed by plug or gasket 44, and then out through vent tube 45.

So much of the fractionating column described above is substantially similar to the fractionating column shown and described in my Patent No. 2,275,648.

The effective length of the distilling tube in accordance with the present invention should be in the order of about 48 in. to about 60 in. and its internal diameter should be in the order of about, preferably, 8 mm., or as low as 3 mm. for low boiling point samples which are usually distilled in low-temperature fractionating columns. For samples which are normally liquids at room temperature, considerably larger tubes may be employed, for example, tubes having an internal diameter even up to about 1 in., or more if found desirable. The larger diameter tubes in accordance with the present invention, either for low boiling point or high boiling point samples, are necessary in order to accommodate a tube core 46 having a packing 47 wrapped around it.

Tube core 46, of stainless steel or other corrosion resisting alloy, is suspended from a hollow, globular-shaped glass member 48 which may be removably joined in an air-tight fit to portion 21 of tube 12 by a suitable rubber connection 49. The tube core extends axially through member 48 and is secured and sealed thereto, as by a cement joint or oil-insoluble synthetic rubber plug 50 which attaches the tube core adjacent its open end to the walls of member 48. As shown in the drawings, tube core 46 extends throughout the length of tube 12 and interiorly thereof and into bulb 18. The closed end of the tube core terminates slightly above the level of the liquefied or liquid sample in the bulb at the start of the operation.

Tube core 46 may have, for example, an outside diameter in the order of about 3 to 6 mm. and the wall thereof has a thickness, preferably, in the order of about 0.005 in. to 0.010 in. Before inserting tube core 46 into tube 12, the packing 47 is wound about the tube core and the composite structure so formed is inserted into the tube. As is manifest from the drawings, packing 47 extends between a point slightly below vessel 29 and the top of distilling bulb 18.

Packing 47 may be, suitably, in the form of a coil or coils of small wires, or of a closely spaced wired structure, as in my Patent No. 2,275,648, although it may have any suitable form. I prefer, however, that the packing be in the form described and claimed in my prior application Serial No. 372,721, filed January 2, 1941, and, particularly, as shown in Fig. 23 of that application. The preferred form of packing in accordance with my invention may be wound about the tube core and inserted in the tube and then treated to form the packing, all as described in my prior application Serial No. 372,721. The packing serves to bring about a more extended and intimate surface contact of the downwardly flowing reflux liquid with the vapors rising from the distilling bulb. The packing of my application Serial No. 372,721 is preferred because it appears to be the most effective packing for bringing about this extended and intimate contact of liquid and vapors.

Under normal conditions of distillation, the vapors rising out of the distillation tube would pass through the hollow portion of member 48 surrounding the tube, then to a line 52 for disposition or collection, as desired. For example, line 52 may be connected to a manifold and, in turn, to an automatic distillation control apparatus as described in my prior Patent No. 2,275,648. In accordance with the present invention, however, no vapors are permitted to leave tube 12 after the initial venting of lighter components because the operation of the column is maintained under total reflux conditions. In consequence, I provide a manually operated valve 53 in line 52 which is closed during the operation of the column in accordance with the present invention.

When the column is at total reflux condition in accordance with the present invention, and after equilibrium is reached, temperatures are accurately measured at closely spaced intervals throughout the length of the column by means of a single-junction thermocouple 54 movable lengthwise in the column, either up or down, thereby indicating or, with suitable instruments, recording, the temperature gradient curve of the column as a function of its length. In the embodiment of the invention shown in the drawings, the apparatus for moving thermocouple 54 is designed to move it either up or down, as desired. The description of the method of my invention as hereinafter set forth is made in connection with an upwardly moving thermocouple.

Thermocouple 54 is a conventional single-junction thermocouple consisting of a copper wire and a constantan wire for low temperature operations, and of other suitable metals for high temperature operations. As shown, it extends throughout the length of tube core 46, with the junction 55 at the bottom of the tube core. The free ends of the thermocouple extend outwardly from the tube core, through an insulated bushing 58 carried by an overlying thermocouple withdrawing bracket 60, and are connected in the usual manner to the terminals 61 and 62 of a recording pyrometer 63, suitably of the potentiometer galvanometer type. As these pyrometers are of a type well-known in the art, the detailed mechanism thereof is not shown. Recording pen 65 of the pyrometer operates with rise in temperature upon a traveling paper sheet or chart 66 to chart the temperature gradient curve 67 as hereinafter described.

In the ordinary operation of these recording pyrometers, it is customary to cause the paper sheet 66 to be moved by clock-work or other constant speed motor and thereby cause the paper sheet to travel at a constant rate of speed. The record made on this sheet indicates not only the temperature of the device under the operation, but also the time at which the record is made. In accordance with the present invention, however, I provide means whereby the feed of paper sheet 66 is synchronized with the movement of thermocouple 54 out of tube core 46, the magnitude of movement of each being exactly proportional. As a result, record 67 provides at once a distillation curve of the sample under treatment because the recording is of the temperature gradient of the column as a function of its length. This follows from the fact that the quantity of each vaporized component of the sample is also a function of the length of the column. The mechanism suitable for this purpose is shown in Fig. 1 of the drawings.

The paper feed roll 70 of pyrometer 63 is mounted upon a drive shaft 71 which is driven by a motor 72. Shaft 71 extends through the motor and is provided at the extremity thereof with a pinion 73 which meshes with a rack 74 normally forced downward by the weight of the rack, which may be supplemented by a spring 75. The driving connection between the motor and pinion 73 is effected by a manually operated clutch 76. It is, of course, apparent that clutch 76 permits the relative independent adjustment of paper feed roll 70 and rack 74. After the adjustment is made clutch 76 is closed. Secured to the upper extremity of rack 74 is the thermocouple withdrawing bracket 60.

It is manifest from the foregoing that operation of motor 72 causes rack 74 to be moved upwardly, thereby withdrawing thermocouple 54 from tube core 46. Synchronized with the movement of the thermocouple is the movement of paper feed roll 70, also driven by motor 72, which feed roll feeds chart 66 a distance exactly proportional to the extent of movement of the thermocouple. Since for accurate recordings it is essential that the thermocouple be permitted to cool down or warm up, depending upon the direction of movement of the thermocouple within the column, to the temperature of its next position and since a period of time must be allowed for insuring that the recording pen of the potentiometer pyrometer will balance with the temperature in the column at each new position of the thermocouple junction, motor 72 is operated intermittently by a conventional electric timer mechanism 78. Since this timing mechanism is of a type well-known in the art, the detailed mechanism thereof is not shown. In accordance with the present invention, the timer mechanism is set to operate the motor intermittently during the operation and drive roll 70 rapidly to run off from about ⅛ in. to about ½ in. of chart, depending upon the desired distance between each successive movement of the thermocouple junction 55, and then stop motor 72, say from 3 to 5 seconds, to allow for a true temperature record.

Figures 4, 5:
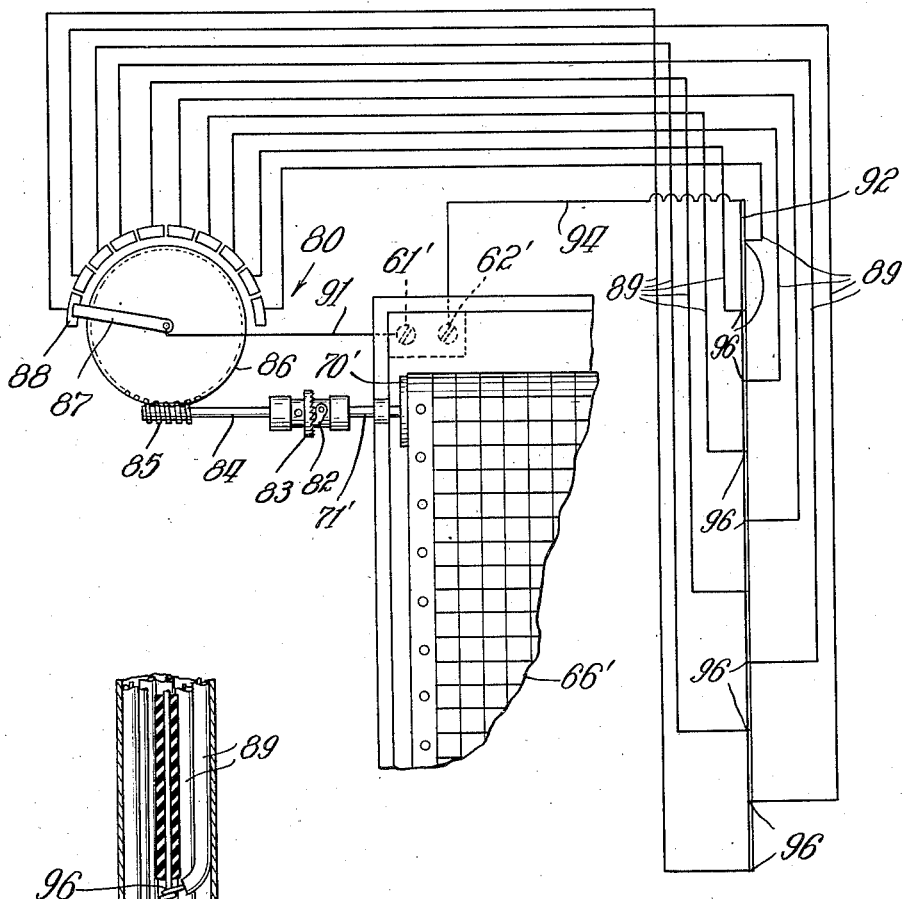
Fig. 4 is a view similar to Fig. 1 of a modified form of apparatus in accordance with the present invention.
Fig. 5 is an elarged fragmentary longitudinal section through the distilling tube of the apparatus of Fig. 4, showing the manner of assembling the thermocouple leads within the distilling tube.

In the modified form of apparatus shown in Fig. 4, a stationary, multiple junction thermocouple is packed into tube core 46' and a temperature gradient curve is recorded on chart 66' of the recording pyrometer by the operation of a rotary thermocouple switch 80 which successively makes electrical contact with each thermocouple junction and the terminals 61' and 62' of the pyrometer. The operation of switch 80 is synchronized with the operation of the motor driven chart roll 70' as follows.

Shaft 71' extends outwardly from the side of chart roll 70' away from the motor and is provided at its extremity with a pawl 82 adapted to engage a ratchet wheel 83 carried on one end of a shaft 84 which is aligned with shaft 71'. A worm 85 is provided on the other end of shaft 84. Worm 85 meshes with a worm wheel 86 which carries the movable contact 87 of the rotary switch. The stationary contacts 88 of the rotary switch are in segment form and each segment is electrically connected to a thermocouple junction through copper wires 89 of the thermocouple, as shown. The contact segments are of such length that the time taken by movable contact 87 in passing from one to the other, in an intermittent operation of roll 70' as described above or in a constant speed operation as hereinafter described, is sufficiently long to enable the pen of the pyrometer to balance and register the true temperature at each thermocouple junction. The electrical connections to the pirometer are from movable contact 87 to terminal 61' through line

91 and from constantan wire 92 of the thermocouple to terminal 62' through line 94.

It is, of course, manifest that the number of thermocouple junctions may vary, as desired, within the limit of the capacity of the tube core to receive the thermocouple wires. The greater the number of thermocouple junctions, the greater the number of temperature recordings possible, and, consequently, the more accurate is the temperature gradient curve. In the drawings, ten thermocouple junctions 96 are provided within the tube core, each being equidistantly spaced throughout the length thereof. It is, of course, obvious that the thermocouple wires must be insulated from each other except at the junctions, as shown in Fig. 5, in order to insure that recordings will be made only of the temperatures of the vapors at the thermocouple junctions.

In the operation of this modified form of my preferred apparatus, motor 72 is, preferably, of the constant speed type, about 1 to 2 R. P. M., and operates to synchronize the feed of chart 66' and the movement of movable contact 87. The movement of contact 87 is clockwise, looking at the drawings, from segment contact to segment contact, and the recordings made are of the temperatures of the vapors surrounding the lowermost junction 96 and, successively, of the succeeding junctions. It is manifest that the wiring may be rearranged, if desired, to obtain recordings of the temperatures of the vapors surrounding the topmost thermocouple first and thereafter and successively the lower ones. When the temperature gradient curve of the sample has been recorded, pawl 82 may be disengaged from ratchet wheel 83 and movable contact 87 brought back to its original position, ready for further use.

The method of analyzing distillable mixtures in accordance with the present invention will now be illustrated, using a cracked refinery gas sample containing the full range of lower boiling hydrocarbons, including methane.

It is first necessary to determine the approximate quantity of sample to be introduced into the column. A certain difficulty is here encountered, not occurring in gradient analysis of higher-boiling samples, in that it is desirable to determine the sample size on the basis of removal of methane and lighter, by prior distillation and then to have enough and but little more of the higher boiling sample portion left to only wet the column packing completely under desired operating conditions, thus obtaining longest temperature gradient curve possible with maximum separation of the more difficultly separable higher-boiling components. It is not, however, essential that this determination be made with exactness for any gas sample and hence, having a general knowledge of the composition of the gas sample to be analyzed, the approximate quantity of gas sample to be entered can be readily estimated to provide at least sufficient sample to wet the entire column packing under total reflux conditions after the methane and lighter components have been distilled from the sample. Larger amounts of sample may, of course, be used, but it is preferred to use only that amount which will provide, in the illustrative example, ethane and heavier residue sufficient to wet the packing or very little more, say about $\frac{1}{10}$ to about 1 liquid cc. of residue in the distilling bulb. It is especially desirable to have the butanes-pentanes "cutpoint" occur near the bottom of the column. It is of course always possible to use a specially added and carefully measured quantity of some pure relatively high-boiling component, or "chaser" to "chase" the last portion of the sample up the column packing (differentiated therefrom by large difference in boiling point between "chaser" and highest boiling component of sample) in which case considerable latitude is permissible in choosing sample size. The chaser can be of such relatively low volatility that all of the sample wetting the column packing can be vaporized at the end of analysis without carrying over appreciable quantity of "chaser" liquid. In the case of the cracked refinery gas of the illustrative sample, approximately 2000 cc. of the gas were introduced and this, after distillation of methane and lighter components, provided enough ethane and heavier residue to wet the entire packing and approximately 1.5 liquid cc. of hexane and higher in the bulb.

The packing used in the column in which the analysis of the illustrative sample was carried out was 50 in. long, 8 mm. packing diameter, (contained in an 8 mm. I. D. precision bore Pyrex tube), with a single rectangular section wire coil wound around a 3.7 mm. O. D. Inconel tube (0.005 in. wall thickness), with a pitch of 4 turns per cm. packing length, and with other dimensions as described in my prior copending application Serial No. 372,721. Its operating holdup at 50% flooding capacity is about 4 liquid cc. of benzene being distilled, but under temperature gradient conditions is about 1.5 to 2.0 liquid cc. It is impossible to measure the exact holdup without refined test methods, and it is not necessary for my purpose to determine it exactly. In any case it is a function of heat input or vapor rate.

Before introducing the sample into the column, the apparatus was prepared for distillation as described in my copending application Serial No. 303,434 and in my Patent No. 2,275,648, for example. The sample was now introduced and distillation was initiated to remove and determine the amount of methane and lighter components in the sample. This was carried out in a conventional manner as described in my aforesaid application and patent. The quantity of the collected vented gases or vapors at standard conditions measured 1160 cc.

When the gas sample was entered, the reflux temperature was about $-180$ to $-190°$ C. After the non-condensibles were slowly distilled off, the reflux temperature flattened out at $-164.4°$ C., the boiling point of methane. Distillation was continued until all of the methane was vented, to the top of the methane-ethane break and distillation was then stopped by closing valve 53. The column was thereafter maintained at total reflux for about $\frac{3}{4}$ hour, at which time the column was substantially at equilibrium. The heat input during distillation of methane and lighter components was 3 watts, and during the $\frac{3}{4}$ hour at total reflux 1.0 watt. The heat input was then maintained at 1.0 watt.

When the column came to equilibrium, the temperature of the column at the lowermost position of the thermocouple junction was recorded on chart 66, and electric timer 78 was then energized to actuate motor 72 and raise thermocouple 54 $\frac{1}{4}$ in. and unroll the chart $\frac{1}{2}$ in. Timer 78 then de-energized motor 72 for 6 seconds until pen 65 became balanced with the temperature at the new position of the thermocouple junction and the pen then recorded the temperature at this new position. This operation was repeated automatically until a temperature gradient curve similar to that shown at 67 was recorded on the chart.

In ordinary fractional distillations one component of the distillable mixture is fractionated off from the top of the column, then another, etc. In a condition of equilibrium under total reflux as described above, all components "fractionate" out at the same time. Actually, the components within the column stratify very sharply, according to their boiling points, substantially as indicated in the temperature gradient curve 67. This curve indicates at once the relative amount of each component of the sample which is thus maintained in vapor and condensate form under conditions of total reflux, from ethylene to hexanes and heavier in the illustrative sample. It is interesting to note that the temperature became lower and lower as the thermocouple is moved upwardly towards the reflux cooling section of column and reverses itself at the point where no more reflux liquid exists, and rapidly approaches room temperature. In the small dead space above the highest liquid condensation zone and up to shut-off valve 53, the hydrocarbon exists only as superheated vapor. Above the reversal point the temperature is meaningless.

The temperature gradient curves formed in accordance with the present invention clearly show a very definite separation between the hydrocarbons of interest, even of ethylene from ethane, isobutane from n-butane, isobutane from isobutene, etc. There is not as sharp a separation between far-boiling components such as methane and ethane relatively to boiling point difference as might be expected from the separation obtained on close boiling compounds. This appears to be due to the small but appreciable thermal conductivity of the packing which "smears up" the "break" for compounds of high temperature difference, which otherwise would take place in a very small length of tube packing.

The temperature gradient curve resulting from the entering of the ethane-and-heavier portion of a cracked refinery gas into the column by the above procedure shows indication of separation between the various individual hydrocarbons of the cracked C-4 group. However, since a major portion of the wetted column length has been devoted to the C-2 and C-3 groups, there is not sufficient wetted column length apportioned to the cracked C-4 hydrocarbons to make closer separation possible, in this example. Accordingly, for purposes of closest possible analysis of the cracked C-4 fraction, it is desirable to first fractionate off from the sample, all propane and lighter hydrocarbons, by above described procedure, before entering or before subjecting to thermal gradient action of the column. Thus, practically the whole length of the column is available to act on the separation of the cracked C-4 hydrocarbons, including the very difficultly separable isobutene and butene-1, and the n-butane and butene-2 pairs of hydrocarbons. To make proper use of the temperature gradient method for such close boiling difficultly separable mixtures, it is necessary to use a highly sensitive, preferably electronic type (as the Brown instrument already mentioned), temperature indicator or recorder, multiple thermocouple junction, expanded temperature scale, whereby 10° C. cover 4 in. or more of chart scale, etc. Also the separation between isobutene and butene-1 is so close that suitable graphic methods are necessary to interpret the relatively gradual temperature curve for this mixture into fairly exact individual percentages. However, the number of plates per ordinary packing length furnished by the packings of my application Serial No. 372,721 applied to this method, and the fact that this method operates at infinite reflux ratio, make the separation possible by fractionation, with sufficient accuracy at least to serve for rapid plant control purposes.

Having obtained the temperature gradient curve by the above procedure, calculations may be made therefrom to determine the quantity of each component of the sample. Two factors must be obtained in making these calculations. One is what I call the "ratio factor" and the other the "correlation factor."

The "ratio factor" or factors serve to correct for the departure of wetted lengths of the same column packing, under identical operating conditions, when wetted by the various hydrocarbons, from equal weight of hydrocarbon per wetted inch relation. Actually, experimental work has shown that fairly accurate results may be obtained, say within about one per cent, for the range of hydrocarbons C-2 to C-4, inclusive, by neglecting the use of any correction factors. This may be due to the experimental facts, that at their boiling points all the hydrocarbons, even methane and pentane, have approximately the same density, the same rise in glass capillary tubes, and same viscosity, thus tending to occupy the same wetted lengths per unit weight in a column packing. In the case of the cracked C-4 fraction, the various hydrocarbons present have the same or practically the same molecular weight, and very close boiling points, hence the need of correction factors further diminishes.

Nevertheless, for cases where the use of correction factors may be considered necessary to gain accuracy, suitable "ratio factors" may be worked out experimentally, by comparison of a number of conventional low-temperature fractional analyses of the same sample with temperature gradient analysis. These factors are simply numbers, conveniently referred to say 1.0 for the case of propane, whereby observed wetted column packing lengths for the various sharply delineated hydrocarbon plateaus may be multiplied by them, before being prorated by weight into the total amount of holdup of column, which corrected plateau lengths are then further multiplied by suitable gravimetric factors to convert them to numbers proportional to gaseous cc. of the hydrocarbons assumed to be vaporized. From these figures, the actual gas cc. may then be derived by using an overall or "correlation factor" derived experimentally by vaporizing the total wetted column content into suitable measuring vaporizers to determine the equivalent gas cc. under standard conditions. Thus, it then becomes possible to prorate the gaseous content of the column so measured for the total column length into the various hydrocarbon plateaus. This will be more clearly illustrated in the typical calculations to follow. However, it is understood that the "ratio factors" used, and the "correlation factor" used in the calculation are purely illustrative, and not contants of this method, especially since they may vary for different packing types, and with certain changes of general operating conditions or procedures.

These "ratio" factors will not vary much with a moderate change in operating conditions even though the absolute holdup of each hydrocarbon will, of course, vary considerably with such change. For instance, the holdup of liquid propane and of liquid isobutane, respectively, per inch of packing will vary considerably as the heat input to the column is changed from 1 to 3 watts, but the ratio of these two holdups may not vary to any substantial extent.

Having these holdup ratios, the correlation factor may be obtained by correlating the holdup ratios with a particular temperature gradient analysis curve, with the amount of gas (methane and non-condensibles) vented from the top of the column by distillation as explained above, and with the small liquid residue, if any, in the distilling bulb. The residue which accumulates in the distilling bulb after the column is at equilibrium under total reflux conditions, providing an excess of sample had been introduced into the column, more than enough to wet the packing under these conditions, can be drawn off and measured. By providing a graduated distilling bulb as in my prior application Serial No. 303,434, the residue may be measured directly, thereby eliminating the need for drawing it off.

The calculations are somewhat complicated by the presence of a residue in the distilling bulb and hence it is desirable to introduce into the column only that amount of gas sample which will provide zero residue or only a negligible quantity of residue under the conditions of total reflux. Where the amount of the liquid residue is quite small, it is preferred to increase the heat input to the column to vaporize the residue and thereby avoid the need of considering it in making the calculations. The increase in heat input will, naturally, increase the holdup of the respective liquid hydrocarbon but it will not vary the ratios of the holdups to any substantial extent as hereinbefore pointed out.

In making the calculations it is necessary to convert all the factors into common units. The volume of the methane-and-lighter was determined preliminary to gradient analysis as pointed out above. The measured quantity of liquid residue (making allowance for the vapor volume of the bulb) is now converted to the common units of gaseous cc. at 760 mm. and at any desired temperature, say 0° C. or 20° C. The entire content of the column is now evaporated rapidly into an evacuated receiver and from the pressure rise in this receiver the total number of gaseous cc. at standard conditions collected in the receiver is computed in the conventional manner as described in my prior application Serial No. 303,434. To be sure of getting and measuring all of the column gas content, additional receivers may be connected to the column to insure getting all of the vapor down to and less than 1.0 mm. absolute pressure in a dry column.

Having determined the absolute gas volumes in standard units of (a) the methane-and-lighter fraction, (b) the liquid residue in the bulb and (c) the portion of the sample existing as reflux liquid on the column packing (represented by the temperature gradient curve); and also having determined the table of factors for correcting the ratios of hydrocarbon plateaus of the temperature gradient curve to true ratios of their corresponding gas volumes (which can be prorated into the total gas volume of the sample portion covered by the curve), it is manifest that an analyst can readily correlate these data to arrive at the proportions or percentages of the components of the sample.

It is manifest from the foregoing that if the sample to be analyzed does not contain a methane-and-lighter fraction and if the amount of sample introduced into the column is chosen to provide no residue in the bulb under total reflux conditions, optionally with use of "chaser" addition to act as heating medium as above mentioned, the calculations necessary for arriving at the final percentages of the components of the sample will be greatly simplified.

The foregoing process of analyzation and the calculations involved, while specifically directed to a low-temperature operation, are also applicable to a high-temperature operation except that the "ratio factors" are obtained by converting boiling point plateaus into actual liquid cc. of holdup of close cut fractions instead of specific hydrocarbons. The reason therefor is that at the higher temperatures of a high-temperature fractionation the individual hydrocarbons do not occur in large percentages, usually boil close to each other, and it is not, therefore, usually possible to fractionate out pure individual hydrocarbons.

In a high-temperature gradient analysis in accordance with the present invention, the operation may be carried out under vacuum or at atmospheric pressure as is the case with a low-temperature operation, and the operation is the same with the exception of the one difference in the matter of calculations as noted above. Obviously, a high-temperature fractionating apparatus must be used in this analysis and this apparatus is substantially the same as the low-temperature apparatus, differing therefrom essentially in the matter of the distilling bulb and the heating means therefor. Fractionating columns both of the low-temperature and the high-temperature types which are particularly suitable for use in accordance with the present invention are disclosed in my prior copending application Serial No. 409,227, filed September 2, 1941. The one disclosed in my prior copending application Serial No. 303,434 is particularly suitable for use in a low-temperature operation in accordance with the present invention.

The operation of the method in accordance with the present invention is much simpler in a high-temperature operation because the sample can usually be handled and measured in the air at room temperature without evaporization or change of composition. From experience it may be determined readily how much of the sample is necessary to introduce into the column in order to wet the column packing under total reflux conditions without leaving a residue or any substantial amount of residue in the distilling bulb. Where the sample of distillable liquid to be analyzed contains a large proportion of high boiling point components, it is desirable to use such an amount of the sample as to provide an appreciable and measurable quantity of liquid residue in the flask.

The most effective low-temperature methods of analyzing fluids now on the market takes from about 6 to 8 hours to run off a complete cracked gas analysis including complete determination of cracked $C_4$ hydrocarbons and involves some rather complicated accessory chemical reagent tests. The corresponding method in accordance with the present invention is far simpler and can be carried out in as little as 2 hours, including the determination of all hydrocarbons through methane, ethylene, ethane, propylene, propane, isobutane, isobutene and butene-1, n-butane and pentanes and heavier. In addition the process in accordance with the present invention requires far less sample than heretofore and the apparatus used in this process is far simpler both in structure and in operation.

Analysis Calculations of Illustrative Example

[All gas volumes given at 0° C., dry, and at 760 mm.]

| | Gas, cc. |
|---|---|
| Methane and lighter vented from top of column and accurately measured in constant volume receivers[1] | 1160 |
| Initial liquid residue in distilling bulb (about 1.5 liquid cc.) as drawn off through bottom stopcock, until bulb practically dry, and measured in constant volume receivers[1] | 351 |
| Holdup of wetted column packing, after all check temperature gradient curves taken (excluding initial liquid residue) after vaporization into and measurement in constant volume receivers[1] | 579 |

Proration of hydrocarbons from temperature gradient curve

| Col. 1 Hydrocarbon | Col. 2 Plateau length (on chart)[2] | Col. 3 "Ratio factor"[3] | Col. 4 Factor to convert gms. hydrocarbon to gaseous, cc. | Col. 5 Unprorated gaseous units (product of Cols. 2, 3 and 4) | Col. 6 Prorated gaseous, cc. |
|---|---|---|---|---|---|
| | Inches | | Cc./gm. | | |
| Ethylene | 5 | 0.9 | 789 | 3,550 | 39.3 |
| Ethane | 15 | 0.9 | 725 | 9,790 | 108.2 |
| Propylene | 5 | 1.0 | 525 | 2,625 | 29.1 |
| Propane | 25 | 1.0 | 502 | 12,550 | 138.8 |
| C-4 fraction | 30 | 1.1 | 487 | 16,100 | 178.1 |
| C-5 and heavier | [3] 21 | 1.2 | 306 | 7,710 | 85.5 |
| | 101 | | | 52,325 | 579.0 |

[1] In accordance with the methods described in my prior patents and application Serial No. 303,434 referred to herein.
[2] Total chart travel 100". Packing length and thermocouple junction travel within packing 50".
[3] Including an arbitrary addition of 1" of chart travel to correct for liquid film wetting distilling bulb.

Summary

| Hydrocarbon | Cc. | Mol or gas vol. percent |
|---|---|---|
| Methane and lighter | 1,160 | 55.50 |
| Ethylene | 39.3 | 1.89 |
| Ethane | 108.2 | 5.18 |
| Propylene | 29.1 | 1.39 |
| Propane | 138.8 | 6.63 |
| C-4 fraction | 178.1 | 8.52 |
| C-5 and heavier | 85.5 | 4.09 |
| Residue (vaporized and measured) | 351 | 16.80 |
| | 2,090.0 | 100.00 |

The method above described may also be applied to the analysis of gaseous compounds containing not only hydrocarbon components, such as methane and ethane, but also nitrogen, oxygen, CO and H₂, such as water gas, highly cracked refinery gases, manufactured gas, etc. In such cases the apparatus and procedure required are similar to those here described, but it is desirable to raise distillation pressure sufficiently so that CO, nitrogen and oxygen may be liquefied at the reflux temperatures available through the use of commercially available liquid air or nitrogen. Hydrogen is not condensible at any reasonable pressure, and can be conveniently and quantitatively first separated by simple vaporization from a liquid air cooled vessel, under the suitable raised pressure, into which the sample is admitted. Carbon dioxide may either be first removed by caustic, as is customary in gas analysis, or it may be allowed to remain and be determined by its wetted plateau length, since the raised distillation pressure will suffice to preclude freezing of the $CO_2$, as happens when it is condensed at atmospheric pressure.

A very useful application of the temperature gradient method is the routine rapid and automatic analysis of small motor fuel samples in a shortened column of the type described for purposes of yielding a true boiling point curve in about an hour's time, somewhat like the well-known "Engler" test, but with a higher degree of fractionation, and easier to check on repeat tests, and by different operators, since no reflux ratio adjustment is involved, and other column conditions can be accurately standardized. Likewise the analytical procedure can be made almost completely automatically controlled and recorded to reduce the human element to a very low minimum, as cannot be done with the Engler test on account of its complexity of variables and susceptibility to room conditions, type of burner, etc.

The method of my invention is not restricted to the determination of the temperatures throughout the length of the column by the thermocouples as described herein since these temperatures may be determined by thermocouples operable or positioned outside of the distillation tube. With such thermocouples, the tube core may be dispensed with and the tube filled with packing as described in my application Serial No. 372,721.

I claim:

1. In apparatus of the type described, a fractionating column including an elongated distilling tube, a metallic tube core positioned within and extending throughout the length of the tube, a fractionating column packing surrounding at least a substantial portion of said tube core, said packing serving to bring about a more extended and intimate surface contact of vapors and reflux within the distilling tube, means to introduce a sample of material to be analyzed into said distilling tube, said means including means to maintain said sample in vapor form throughout said tube, means to close in said tube from withdrawal of the sample or for admission of additional amounts of sample and means for cooling the upper end of the tube to condense vapors therein and provide reflux, a thermocouple movable lengthwise throughout the length of said tube core, a recording pyrometer including a chart and chart roll to which said thermocouple is electrically connected and means for moving said thermocouple lengthwise through said tube core and simultaneously feeding said chart from said roll a distance proportional to the movement of said thermocouple within said tube core, thereby recording on said chart a temperature gradient curve as a function of the length of the distilling tube.

2. In apparatus of the type described, a fractionating column including an elongated distilling tube, a metallic tube core positioned within and extending throughout the length of the tube, a fractionating column packing surrounding at least a substantial portion of said tube core, said packing serving to bring about a more extended and intimate surface contact of vapors and reflux within the distilling tube, means to introduce a sample of material to be analyzed into said distilling tube, said means including means to maintain said sample in vapor form throughout said tube, means to close in said tube from withdrawal of the sample or for admission of additional amounts of sample and means for cooling the upper end of the tube to condense vapors therein and provide reflux, a thermocouple movable lengthwise throughout the length of said tube core, a recording pyrometer including a chart and chart roll to which said thermocouple is electrically connected and means for moving said thermocouple step by step lengthwise through said tube core and simultaneously feeding said chart step by step from said roll a distance proportional to the stepwise movement of said thermocouple within said tube core, thereby recording on said chart a temperature gradient curve as a function of the length of the distilling tube.

3. In apparatus of the type described, a fractionating column including an elongated distilling tube, a metallic tube core positioned within and extending substantially throughout the length of said tube, a fractionating column packing surrounding at least a substantial portion of said tube core, said packing serving to bring about a more extended and intimate surface contact of vapors and reflux within the distilling tube, means to introduce a sample of material to be analyzed into said distilling tube, said means including means to maintain said sample in vapor form throughout said tube, means to close in said tube from withdrawal of the sample or for admission of additional amounts of sample and means for cooling the upper end of the tube to condense vapors therein and provide reflux, a stationary, multiple junction thermocouple positioned within said tube core with the junctions spaced lengthwise of said tube core, a recording pyrometer to which said multiple junction thermocouple is electrically connected and means to record the temperature at each thermocouple junction successively on the chart of said recording pyrometer.

4. In apparatus of the type described, a fractionating column including an elongated distilling tube, a metallic tube core positioned within and extending substantially throughout the length of said tube, a fractionating column packing surrounding at least a substantial portion of said tube core, said packing serving to bring about a more extended and intimate surface contact of vapors and reflux within the distilling tube, means to introduce a sample of material to be analyzed into said distilling tube, said means including means to maintain said sample in vapor form throughout said tube, means to close in said tube from withdrawal of the sample or for admission of additional amounts of sample and means for cooling the upper end of the tube to condense vapors therein and provide reflux, a stationary, staggered, multiple junction thermocouple positioned within said tube core with the junctions spaced lengthwise of said tube core, a recording pyrometer to which said multiple junction thermocouple is electrically connected and means to record the temperature at each thermocouple junction successively on the chart of said recording pyrometer.

5. In the method of analyzing a mixed fluid, the steps comprising introducing a sample of such fluid into a fractionating column, closing off the column to the introduction and removal of additional quantities of such fluid, converting constituents of said sample into vapors and condensate within the column while the column is maintained in the aforesaid closed condition and therefore under total reflux conditions, thereby substantially separating and stratifying individual constituents or groups of constituents of the sample in vapor and condensate form within the column in the order of their volatilities, and determining the temperatures and relative quantities of the separated and stratified vapors and condensate according to their positions within the column and while said column is maintained in the aforesaid closed condition.

6. In the method of analyzing a mixed hydrocarbon fluid including methane and lighter components, the steps comprising introducing a sample of such fluid into a fractionating column, converting constituents of said sample into vapors within the column, rectifying the vaporized constituents to separate individual constituents in vapor phase in the order of their volatilities, removing methane and lighter components from the column, closing off the column to the introduction and removal of additional quantities of such fluid, retaining the remaining constituents of the sample in vapor and condensate form within the column while the column is maintained in the aforesaid closed condition and therefore under total reflux conditions, thereby substantially separating and stratifying individual constituents or groups of constituents of the entrapped portion of the sample in vapor and condensate form within the column in the order of their volatilities, and determining the temperatures and relative quantities of the separated and stratified vapors and condensate according to their positions within the column and while said column is maintained in the aforesaid closed condition.

7. In the method of analyzing a mixed fluid, the steps comprising introducing a sample of such fluid into a fractionating column, closing off the column to the introduction and removal of additional quantities of such fluid, converting constituents of said sample into vapors and condensate within the column, while the column is maintained in the aforesaid closed condition and therefore under total reflux conditions, thereby substantially separating and stratifying individual constituents or groups of constituents of the sample in vapor and condensate form within the column in the order of their volatilities, moving a thermocouple lengthwise in the column through the separated and stratified vapors and condensate while the column is maintained under the aforesaid total reflux conditions to determine the temperatures of the separated and stratified vapors and condensate, and recording the temperatures of the separated and stratified vapors and condensate as a function of the length of the column.

8. In the method of analyzing a mixed fluid, the steps comprising introducing a sample of such fluid into a fractionating column, closing off the column to the introduction and removal of additional quantities of such fluid, converting constituents of said sample into vapors and condensate within the column, while the column is maintained in the aforesaid closed condition and therefore under total reflux conditions, thereby substantially separating and stratifying individual constituents or groups of constituents of the sample in vapor and condensate form within the column in the order of their volatilities, moving a thermocouple step by step lengthwise in the column through the separated and stratified vapors and condensate while maintaining the column under the aforesaid total reflux conditions to determine the temperature of the separated and stratified vapors and condensate at each step and simultaneously plotting the temperatures on a sheet against the position of the thermocouple within the column, thereby obtaining a temperature gradient curve as a function of the length of the column.

9. In the method of analyzing a mixed fluid, the steps comprising introducing a sample of such fluid into a fractionating column, closing off the column to the introduction and removal of additional quantities of such fluid, converting constituents of said sample into vapors and condensate within the column, while the column is maintained in the aforesaid closed condition and therefore under total reflux conditions, thereby substantially separating and stratifying individual constituents or groups of constituents of the sample in vapor and condensate form within the column in the order of their volatilities, moving a thermocouple step by step lengthwise in the column through the separated and stratified vapors and condensate while maintaining the column under the aforesaid total reflux conditions to determine the temperature of the vapors and condensate at each step and simultaneously moving a chart step by step a distance proportional to the stepwise movement of the thermocouple while simultaneously recording the temperatures on the chart against the position of the thermocouple within the column, thereby obtaining a temperature gradient curve as a function of the length of the column.

10. In the method of analyzing a mixed hydrocarbon fluid including methane and lighter components, the steps comprising introducing a sample of such fluid into a fractionating column, converting constituents of said sample into vapors within the column, rectifying the vaporized constituents to separate individual constituents in vapor phase in the order of their volatilities, removing methane and lighter components from the column, closing off the column to the introduction and removal of additional quantities of such fluid, retaining the remaining constituents of the sample in vapor and condensate form within the column while the column is maintained in the aforesaid closed condition and therefore under total reflux conditions, thereby substantially separating and stratifying individual constituents or groups of constituents of the entrapped portion of the sample in vapor and condensate form within the column in the order of their volatilities, moving a thermocouple step by step lengthwise in the column through the separated and stratified vapors and condensate while maintaining the column under the aforesaid total reflux conditions to determine the temperature of the vapors and condensate at each step, and simultaneously moving a chart step by step a distance proportional to the stepwise movement of the thermocouple while simultaneously recording the temperatures on the chart against the position of the thermocouple within the column, thereby obtaining a temperature gradient curve as a function of the length of the column.

11. In the method of analyzing a mixed fluid, the steps comprising introducing a sample of such fluid to be analyzed into a fractionating column including a distilling tube having a packing to bring about a more extended contact between the vapors and reflux formed in the tube, the quantity of sample being at least sufficient to wet the packing under total reflux conditions, closing off the column to the introduction and removal of additional quantities of such fluid, converting constituents of said sample into vapors and condensate within the tube while the column is maintained in the aforesaid closed condition and therefore under total reflux conditions, thereby substantially separating and stratifying the individual constituents or groups of constituents of the sample in vapor and condensate form within the tube in the order of their volatilities, and determining the temperatures and relative quantities of the separated and stratified vapors and condensate according to their positions within the tube and while said column is maintained in the aforesaid closed condition.

12. In the method of analyzing a mixed fluid, the steps comprising introducing a sample of such fluid to be analyzed into a fractionating column including a distilling tube having a packing to bring about a more extended contact between the vapors and reflux formed in the tube, the quantity of sample being at least sufficient to wet the packing under total reflux conditions, closing off the column to the introduction and removal of additional quantities of such fluid, converting constituents of said sample into vapors and condensate within the tube while the column is maintained in the aforesaid closed condition and therefore under total reflux conditions, thereby substantially separating and stratifying the individual constituents or groups of constituents of the sample in vapor and condensate form within the tube in the order of their volatilities, moving a thermocouple step by step lengthwise in the tube through the separated and stratified vapors and condensate while maintaining the column under the aforesaid total reflux conditions to determine the temperature of the vapors and condensate at each step and simultaneously moving a chart step by step a distance proportional to the stepwise movement of the thermocouple while simultaneously recording the temperatures on the chart against the position of the thermocouple within the tube, thereby obtaining a temperature gradient curve as a function of the length of the tube.

13. In the method of analyzing a mixed hydrocarbon fluid including methane and lighter components, the steps comprising introducing a sample of such fluid to be analyzed into a fractionating column including a distilling tube having a packing to bring about a more extended contact between the vapors and reflux formed in the tube, the quantity of the sample exclusive of the methane and lighter components thereof being at least sufficient to wet the packing under total reflux conditions, converting constituents of said sample into separated vapor and rectifying the vaporized constituents to separate individual constituents in vapor phase in the order of their volatility, removing methane and lighter components from the column, closing off the column to the introduction and removal of additional quantities of such fluid, retaining the remaining constituents of the sample in vapor and condensate form within the tube while maintaining the column in the aforesaid closed condition and therefore under total reflux conditions, thereby substantially separating and stratifying individual constituents or groups of constituents of the entrapped portion of the sample in vapor and condensate form within the tube in the order of their volatilities, moving a thermocouple step by step lengthwise in the tube through the separated and stratified vapors and condensate while maintaining the column under the aforesaid total reflux conditions to determine the temperature of the vapors and condensate at each step, and simultaneously moving a chart step by step a distance proportional to the stepwise movement of the thermocouple while simultaneously recording the temperatures on the chart against the position of the thermocouple within the tube, thereby obtaining a temperature gradient curve as a function of the length of the tube.

WALTER J. PODBIELNIAK.